Aug. 20, 1929.  E. M. CLAYTOR  1,725,256
CONTROL APPARATUS
Filed June 11, 1927
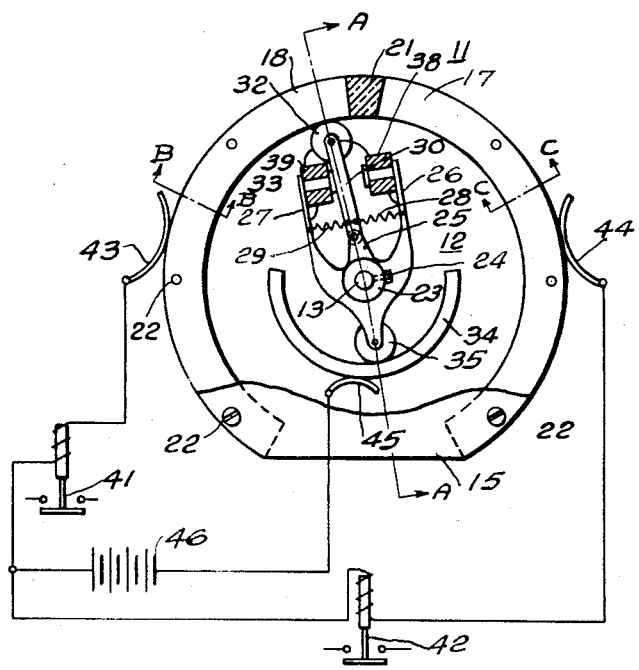
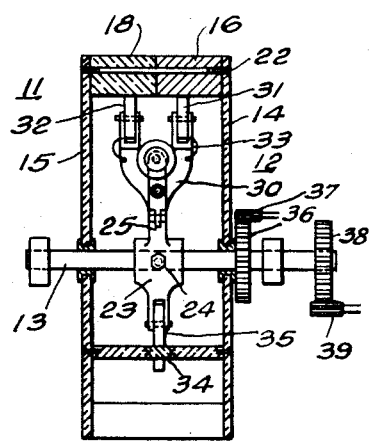
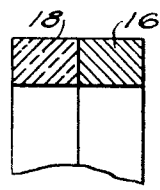
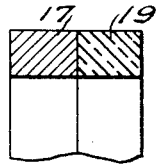
WITNESSES:
INVENTOR
Edward M. Claytor.
BY
ATTORNEY Patented Aug. 20, 1929.

1,725,256

UNITED STATES PATENT OFFICE.

EDWARD M. CLAYTOR, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL APPARATUS.

Application filed June 11, 1927. Serial No. 198,189.

My invention relates to improvements in electrical circuit controlling apparatus and has particular relation to gyro-ship steering controllers.

It is common practice today, to employ well known gyro-ship steering systems for maneuvering ships. In such systems, the operation of the motors employed for moving the ship's rudders are controlled indirectly by the ship's compass.

The circuits of the steering systems are controlled by the compass and the various control devices accordingly respond to the shifting of the compass parts. Therefore, the ship's compass causes the steering control means to function with every deviation of the ship from its course, and there results a great deal of vibration or teetering of the control apparatus which is undesirable.

The object of my invention, generally stated, is to provide a controller that may be readily adapted to control systems already installed and which also will be relatively easy to manufacture and reliable in operation.

Another object of my invention is to provide for preventing the teetering of the control apparatus that is employed in a control circuit for automatic ship steering.

It is also an object of the invention to provide for automatically actuating a movable contact member independently of the main actuating means when it reaches predetermined points, to prevent undesirable making and breaking of circuit connections in control systems in response to slight movements of the main actuating means for the movable contact member.

Other objects of the invention will become apparent when the specification is considered in connection with the accompanying drawing, in which;

Figure 1 is a view in side elevation of a circuit controller, constructed in accordance with my invention, from which the side plate has been removed to show the structural features, Fig. 2 is a view in cross-section taken along the line A—A and illustrating the various parts of the controller, Figs. 3 and 4 are sectional views of the outer conducting and non-conducting rails taken along lines B—B and C—C, respectively.

The embodiment of my invention described in this specification is primarily intended to be utilized in a gyro-ship steering control system, and is disposed to operate between the ship's compass and the motors employed for effecting the actuation of the rudder.

Referring now to the drawing, two contact carriers 11 and 12 are disposed on the shaft 13. In this particular construction the outer carrier 11 which simulates a drum-shaped casing is rotatably mounted on the shaft 13, while the inner contact carrier 12 is pinned to it.

As shown, the outer carrier 11 comprises two circular end plates 14 and 15 and curved conductor members or rails 16 and 17, and insulating members 18 and 19 which are disposed between the outer portions of the plates to form the body wall of the casing. The rails 16 and 17 which conform in shape to the segments of a ring of rectangular cross-section, are paired with the insulating rails 18 and 19 and disposed in staggered relation in the arc of a circle, the center of which is the axis of the shaft 13.

In order to insulate the rails 16 and 17 from one another, the ends are spaced and an insulating block 21 is mounted between them. The rails 16, 17, 18 and 19, and the insulating block 21 are retained in position between the end plates 14 and 15 by means of bolts 22. Further, the members of the body of the casing are disposed to present continuous inner and outer surfaces over which contact rollers and brushes may move without excessive wear.

The inner contact carrier 12 comprises a substantially Y-shaped member 23 provided with an opening for the reception of the shaft 13, and with a set screw 24 for setting it in any predetermined position relative to the shaft 13. As shown, an upwardly extending bifurcated projection 25 is provided on the Y-shaped member between the arms 26 and 27.

A second Y-shaped member 30 is pivotally mounted on the projection 25 and is retained centrally spaced between the arms 26 and 27 by means of springs 28 and 29. In this particular construction, the springs are of the tension type and are connected between the arms 26 and 27 of the Y-shaped member 23.

It will be noted that the arms of the Y-shaped member 30 lie in a plane turned through 90° from the plane of the arms 26 and 27 of the Y-shaped member 23. Further, the arms of the Y-shaped member 30 are bifurcated to receive contact members which, in this instance, are pivotally mounted rollers 31 and 32.

The arms of the Y-shaped member 23 are spaced so that the rollers 31 and 32 will ride on the rails 16 and 17 respectively, when the contact carrier is rotated about the axis of the shaft 13. In order to insulate the contact rollers 31 and 32 for a purpose that will appear hereinafter, insulating plates 33 are disposed between the bifurcated ends of the arms of the Y-shaped member 30 and the body of the latter. Therefore, the contact rollers 31 and 32 may be utilized for establishing contact between the rails 16 and 17 respectively, and members to which it is desired to convey current.

With a view to conveying current collected by the contact members or rollers 31 and 32 to any circuit, a semi-circular conductor rail 34 is disposed concentrically with the rails 16 and 17. A contact member in the form of a roller 35 is pivotally mounted in the foot of the Y-shaped member 23 and disposed to ride on the inner face of the rail 34.

It is well known in the art of automatic ship steering that the motors employed for operating a ship's rudder are indirectly controlled by the ship's compass, and where a controller embodying the features of this invention is utilized for governing the operation of such steering systems, provision must be made for actuating the contact carriers 11 and 12. It is common practice to connect a pair of small pilot steering motors to respond to the movements of the ship's compass, and it is these motors that are utilized to actuate the contact carriers 11 and 12. The operation of the compass and pilot motors is so well known in the art that it is deemed unnecessary to illustrate them in connection with this specification.

In this particular embodiment of the invention, a gear 36 is mounted on the contact carrier 11 and disposed to mesh with a pinion 37, which is driven by one of the pilot steering motors, and a gear wheel 38 is keyed to the shaft 13 and meshes with a pinion 39 driven by the other pilot steering motor.

Under normal operation at sea, a ship will roll in the waves and be deflected from its course by the winds with the result that the moving parts of the ship's compass are caused to swing back and forth across the line of the ship's course. If the ship is equipped with an automatic steering control system, the compass will function upon deviations of the ship from its course to make and break the circuits of the pilot steering motors, which actuate the contact carriers 11 and 12 of the controller. Actuation of the controller contact carriers 11 and 12 cause the rudder motors to operate.

In navigating a ship very slight deviations of it from its course, caused by the rolling motion given it by the sea and wind, will effect movements of the compass and the closure of the pilot motor circuits. Ordinarily, if a controller is not interposed between the pilot motors and the rudder motors the steering apparatus will be operated in a jerky or chattering manner.

It is with a view to eliminating this chattering that the controller disclosed in this application has been introduced and disposed between the steering motors and the rudder actuating motors.

Assuming now that the contact carriers 11 and 12 are disposed with the rollers 31 and 32 centrally positioned on the insulating block 21, then upon the closure of a pilot steering motor circuit for an instant one of the carriers will be actuated. However, the carrier may rotate through a predetermined angle without closing a rudder operating motor circuit.

It will be readily understood that by extending the insulating block 21 through a proper angle, that provision may be made for permitting a certain operation of the pilot steering motors in response to the actuation of the compass caused by the ship rolling in the sea, without effecting an operation of the rudder operating motors. Thus, unless the ship deviates an appreciable distance from the course it is desired to follow, the rudder operating motors will not be actuated and the operation of the steering motors due to the swing of the compass caused by the roll of the ship, will be taken care of by the oscillation of the inner contact carrier on the insulating block 21.

However, if the ship deviates from its course, a predetermined amount, the compass will function to retain a steering motor circuit closed for a sufficient length of time to effect the relative movement of the contact carriers 11 and 12, to project one of the contact rollers 31 or 32 into engagement with its corresponding conducting rail 16 or 17. In this manner a circuit of a rudder operating motor may be closed.

However, in the actuation of the contact carriers to effect the operation of the rudder operating motors, it will be readily understood that a similar chattering effect to the one described may be caused by the contact rollers 31 and 32 engaging the ends of the conductor rails 16 and 17, and then swinging back on to the insulating block 21. In order to assure the closure of a rudder motor circuit to effect a proper actuation of the rudder when the ship has deviated from its course to such an extent as to cause a rotation of the contact carriers through a predetermined angle, provision is made for actuating the contact rollers 31 and 32 independently of the movement of the contact carriers.

As shown in Figs. 1 and 2, solenoids 38 and 39 are disposed on the arms 26 and 27 of the Y-shaped member 23 and in alignment with the body of the Y-shaped member 23. One of the solenoids is electrically connected between the contact roller 31 and the Y-shaped member 23, while the other is electrically connected between the contact roller 32 and the Y-shaped member 23.

In order to utilize the control device described hereinbefore for controlling the actuating circuits provided for operating the line switches 41 and 42 of rudder propelling motors, 2 brushes 43 and 44 are disposed to ride on the outer contacting surface of the body member of the contact carrier 11, and to engage the conductor rails 16 and 17, respectively, while a brush 45 is provided to engage the conductor rail 34. In this manner provision is made for establishing circuits through the control device.

Line switches 41 and 42 which may be utilized for controlling the rudder operating motors, are illustrated in Fig. 1. Any suitable source of current supply may be provided for actuating these switches and in this instance a battery 46 is utilized.

For the purpose of explaining the operation of the control device, it will be assumed that the ship has deviated from its course and caused the rotation of the inner contact carrying member 12 counter-clockwise as illustrated in Fig. 1. As will be readily understood, when the contact member 31 engages the end of the conductor rail 16, a circuit will be established which will extend from the positive terminal of the battery 46 through the actuating coil of the switch 41, brush 43, conductor rail 16, contact roller 31, solenoid 38, the Y-shaped member 23, contact roller 35, rail 34, brush 45 back to the battery 46. Upon the energization of the solenoid 38, the Y-shaped member 30 is rotated counter-clockwise about its pivot point 25 against the action of the springs 28 and 29, moving the contact member 31 onto the rail 16, independently of the movement of the inner contact carrier 12.

Therefore, a small clockwise movement of the inner contact member 12 or a counter-clockwise movement of the outer contact member 11 will not interrupt the rudder motor circuit established, and the rudder will be actuated to return the ship to its proper course. When the ship is returned to the desired course, the contact carriers 11 and 12 will be rotated relatively, returning the contact rollers 31 and 32 to the insulating block 21, and as the rollers 31 and 32 pass out of engagement with the rails 16 and 17, interrupting the circuit through one or the other of the rudder motors, the springs 28 and 29 will return the Y-shaped member 30 to its normally biased position, thereby projecting the contact rollers 31 and 32 some distance onto the insulating segment.

While I have illustrated and described a particular embodiment of my invention, it is intended that all matter contained herein shall be interpreted as illustrative and not in a limiting sense, since manifestly the same may be considerably varied without departing from the spirit of the invention as set forth in the appended claims.

I claim as my invention:

1. In a control device, in combination, a contact carrying member rotatably mounted, a contact member movably mounted on the contact carrying member, resilient means for biasing the contact member to a predetermined position, and electromagnetic means disposed to actuate the contact member independently of the contact carrying member.

2. In a control device, in combination, a rotatably mounted contact carrying member, a contact member pivotally mounted on the contact carrying member, a pair of arms provided on the contact carrying member, the contact member being disposed between said arms, resilient means disposed to bias the pivotally mounted contact member to a predetermined position and electromagnetic means carried by the arms to actuate the pivotally mounted contact member.

3. In a control device, in combination, a rotatably mounted contact carrier, a contact member movably mounted on the carrier, a plurality of conductor rails disposed to be engaged by the movable contact member, electromagnets for actuating the movable contact member, means for energizing the electromagnets when the movable contact member engages the conductor rails to actuate the movable contact member independently of the contact carrier.

4. In a control device, in combination, a rotatably mounted contact carrier carrying a plurality of contact members, a contact supporting member movably mounted on the carrier, a plurality of concentrically located conductor rails rotatably mounted and disposed to be engaged by the contact members, resilient means biasing the movably mounted contact supporting member to a predetermined position, electromagnets for actuating said movably mounted contact supporting member, a source of energy, a plurality of stationary contact members connected to said source and disposed to engage the concentrically located conductor rails for energizing the electromagnets when the movable contact members engage the concentrically located conductor rails to actuate the movably mounted contact supporting member independently of the contact carrier, said biasing resilient means returning the movable mounted contact supporting member to its normal position when the energizing circuit is interrupted.

5. In a control device, in combination, a pair of contact carriers disposed in concentric relation, a contact member movably mounted on one of said carriers and disposed to engage the other contact carrier, means for actuating the movably mounted contact member relative to both contact carriers independently of the movement of said carriers.

6. In a gyro ship steering control device, in combination, two movable circuit making and interrupting elements, resilient and magnetic means disposed to actuate one of said elements to effect relative movement of the elements after engagement or disengagement.

7. A control device comprising a movable contact carrier, a plurality of contact members mounted on the carrier, a plurality of conductors insulated from one another and disposed to be engaged by the contact members, means provided on the movable contact carrier to bias the contact members to a predetermined position, electromagnetic means arranged to actuate the contact members independently of the carrier when the movable contact members engage said conductors.

8. A control device comprising two insulated curved conductor rails, another curved conductor rail disposed in concentric relation with the insulated conductor rails, a pivotally mounted Y-shaped contact carrier, carrying contact members for engaging the rails, a support for two of said contact members, said support being pivotally mounted on and disposed between the arms of said Y-shaped carrier, resilient means biasing said support in a predetermined position with respect to said arms, electromagnetic means mounted on the arms and disposed to actuate the pivotally mounted support.

9. A control device comprising two insulated curved conductor rails, and another curved conductor rail disposed in concentric relation with the insulated conductor rails, said conductor rails being mounted to rotate about their common center, a source of current and means for connecting one side of said source to the two insulated conductor rails and the other side of the source to the other conductor rail, a substantially Y-shaped contact carrier pivotally mounted at its center and disposed to rotate within said conductor rails, a plurality of contact members, one of which is carried on the base of said Y-shaped member and disposed to engage one of the conductor rails, a contact carrying element pivotally attached to and carried between the arms of said Y-shaped carrier, two contact members being carried on, but insulated from, said pivotally attached element and disposed to engage the insulated conductor rails, resilient means for biasing said pivotally mounted contact carrying element to a predetermined position, a pair of electromagnets mounted on the arms of the Y-shaped member, means for connecting the insulated contact members mounted on the pivotally attached contact carrying element to the electromagnets and the Y-shaped member permitting said electromagnets to be energized when the contact members are moved into engagement with the conductor rail, for actuating the pivotally mounted contact carrying element independently of the rotatably mounted contact carrier to positively establish a circuit.

10. In a control device, in combination, relatively movable contact members disposed to be actuated into and out of engagement, electromagnetic means carried by one of the contact members for effecting relative movement of the contact members when they engage, and resilient means for effecting relative movement of the contact members when they disengage.

11. In a control device, in combination, relatively movable contact members disposed to be actuated into and out of engagement, electromagnetic means carried by one of the contact members for effecting relative movement of the contact members when they engage, spring means disposed to be energized upon the functioning of the electromagnetic means for effecting relative movement of the contact members when they disengage.

In testimony whereof, I have hereunto subscribed my name this 7th day of June 1927.

EDWARD M. CLAYTOR.